(12) United States Patent
Meiners

(10) Patent No.: US 12,096,722 B2
(45) Date of Patent: Sep. 24, 2024

(54) CONVEYING AND COLLECTING DEVICE WITH A DRIVABLE CONVEYING AND COLLECTING UNIT AND AGRICULTURAL CROP PRESS WITH THE CONVEYING AND COLLECTING DEVICE

(71) Applicant: Maschinenfabrik Bernard Krone GmbH & Co. KG, Spelle (DE)

(72) Inventor: Michael Meiners, Schapen (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 713 days.

(21) Appl. No.: 17/242,489

(22) Filed: Apr. 28, 2021

(65) Prior Publication Data

US 2021/0337737 A1    Nov. 4, 2021

(30) Foreign Application Priority Data

Apr. 29, 2020 (DE) ...................... 10 2020 002 580.3

(51) Int. Cl.
*A01F 15/10* (2006.01)
*B30B 9/30* (2006.01)

(52) U.S. Cl.
CPC .......... *A01F 15/101* (2013.01); *B30B 9/3007* (2013.01); *A01F 2015/102* (2013.01)

(58) Field of Classification Search
CPC ............ A01F 2015/102; A01F 2015/04; A01F 2015/101
See application file for complete search history.

(56) References Cited

U.S. PATENT DOCUMENTS

| | | | | |
|---|---|---|---|---|
| 2,080,316 A | * | 5/1937 | Innes ...................... | A01F 15/00 100/145 |
| 2,552,888 A | * | 5/1951 | Druetta .................... | A01F 15/04 100/189 |
| 4,034,543 A | * | 7/1977 | Voth ....................... | A01D 89/00 100/189 |
| 4,106,268 A | * | 8/1978 | White .................... | A01F 15/101 100/2 |

(Continued)

FOREIGN PATENT DOCUMENTS

| | | | | |
|---|---|---|---|---|
| AU | 2020206761 A1 | * | 8/2021 | ........... A01D 85/005 |
| BE | 1006405 A3 | * | 8/1994 | ........... A01F 15/101 |

(Continued)

*Primary Examiner* — Adam J Behrens
*Assistant Examiner* — Ashley A Kaercher
(74) *Attorney, Agent, or Firm* — Gudrun E. Huckett

(57) ABSTRACT

A conveying and collecting device for a crop press has a conveying and collecting unit switchable from a collecting mode into a lifting mode. A first cam track for rotating feed tines of a feed bar is switchable from a fixed state, in which it is stationary and the conveying and collecting unit is in collecting mode, into a moving state, in which it is driven by the conveying and collecting unit that is in lifting mode. A coupling device for operatively coupling the first cam track with the conveying and collecting unit is provided, and a switching device triggers or prevents coupling based on the filling level of the collecting chamber that is detected by a sensor unit. Triggering or preventing of the coupling process is mechanically independent of the detected filling level. A crop press is provided with such a conveying and collecting device.

16 Claims, 6 Drawing Sheets

(56) References Cited

U.S. PATENT DOCUMENTS

| | | | |
|---|---|---|---|
| 4,372,104 A * | 2/1983 | Simonis | A01F 15/04 100/189 |
| 4,375,786 A * | 3/1983 | Oosterling | A01F 15/046 100/189 |
| 4,524,574 A * | 6/1985 | Ratzlaff | A01F 15/04 100/189 |
| 4,999,987 A * | 3/1991 | Eggenmueller | A01F 15/101 100/189 |
| 6,161,368 A * | 12/2000 | Wilkens | A01F 15/0841 56/341 |
| 6,425,234 B1 * | 7/2002 | Krone | A01F 15/101 56/341 |
| 2003/0172649 A1 * | 9/2003 | Obser | F16D 33/18 60/330 |
| 2012/0179338 A1 * | 7/2012 | Dresher | A01F 15/101 701/50 |
| 2012/0247348 A1 * | 10/2012 | Herron | A01F 15/0825 100/353 |
| 2013/0112094 A1 * | 5/2013 | Smith | A01F 15/08 100/99 |
| 2016/0029567 A1 * | 2/2016 | Meiners | A01F 15/10 56/500 |
| 2017/0105347 A1 * | 4/2017 | Rosseel | A01D 89/002 |
| 2017/0105348 A1 * | 4/2017 | Rosseel | A01F 15/10 |
| 2017/0188519 A1 * | 7/2017 | Figger | A01F 15/0841 |
| 2018/0125011 A1 * | 5/2018 | Biziorek | A01F 15/10 |
| 2019/0059230 A1 * | 2/2019 | Lang | A01F 15/10 |
| 2019/0133046 A1 * | 5/2019 | Standaert | A01F 15/0841 |
| 2019/0191629 A1 * | 6/2019 | Bonte | A01F 15/101 |
| 2019/0307075 A1 * | 10/2019 | Lang | A01F 15/04 |
| 2020/0008359 A1 * | 1/2020 | Thies | A01F 15/0841 |
| 2020/0077594 A1 * | 3/2020 | Tacke | A01F 15/0825 |
| 2020/0077595 A1 * | 3/2020 | Lang | A01F 15/0825 |
| 2020/0170191 A1 * | 6/2020 | Devroe | A01F 15/101 |
| 2020/0214213 A1 * | 7/2020 | Olander | A01D 85/005 |
| 2020/0214216 A1 * | 7/2020 | Olander | A01D 85/005 |
| 2020/0214217 A1 * | 7/2020 | Olander | A01F 15/046 |
| 2020/0214220 A1 * | 7/2020 | Olander | A01F 15/14 |
| 2020/0214222 A1 * | 7/2020 | Olander | A01F 15/04 |
| 2020/0215918 A1 * | 7/2020 | Olander | A01F 15/0841 |
| 2021/0100169 A1 * | 4/2021 | Vandaele | A01F 15/02 |
| 2021/0337737 A1 * | 11/2021 | Meiners | B30B 9/3007 |
| 2021/0337738 A1 * | 11/2021 | Meiners | A01F 15/0858 |
| 2021/0400880 A1 * | 12/2021 | Kraus | A01F 15/101 |
| 2022/0287241 A1 * | 9/2022 | Oskamp | A01F 15/10 |
| 2023/0189715 A1 * | 6/2023 | Liefooghe | A01F 15/0841 100/142 |

FOREIGN PATENT DOCUMENTS

| | | | | |
|---|---|---|---|---|
| BE | 1020297 A3 | * | 7/2013 | A01F 15/04 |
| BE | 1024216 B1 | * | 12/2017 | A01F 15/042 |
| BE | 1024813 B1 | * | 7/2018 | A01F 15/0841 |
| CN | 107846845 A | * | 3/2018 | A01F 15/101 |
| CN | 107920470 A | * | 4/2018 | A01F 15/101 |
| CN | 109729819 A | * | 5/2019 | |
| CN | 109922656 A | * | 6/2019 | A01F 15/0705 |
| CN | 110226418 A | * | 9/2019 | A01F 11/00 |
| DE | 4216483 A1 | * | 11/1993 | A01F 15/10 |
| DE | 19715280 A1 | * | 10/1998 | A01F 15/101 |
| DE | 198 29 276 | | 1/2000 | |
| DE | 19829276 A1 | * | 1/2000 | A01F 15/101 |
| DE | 102018112843 A1 | * | 12/2019 | |
| DE | 102021106061 A1 | * | 9/2022 | A01F 15/10 |
| EP | 508186 A1 | * | 10/1992 | A01F 15/101 |
| EP | 636308 A1 | * | 2/1995 | A01D 90/02 |
| EP | 1060653 A1 | * | 12/2000 | A01F 15/0841 |
| EP | 1133914 A2 | * | 9/2001 | A01F 15/101 |
| EP | 1306002 A1 | * | 5/2003 | A01F 15/101 |
| EP | 2433486 A1 | * | 3/2012 | A01F 15/101 |
| EP | 3545752 A1 | * | 10/2019 | A01F 15/101 |
| EP | 3666061 A2 | * | 6/2020 | A01F 15/10 |
| EP | 3689131 A1 | * | 8/2020 | A01F 15/0825 |
| EP | 3903563 A1 | * | 11/2021 | A01F 15/10 |
| EP | 3932179 A1 | * | 1/2022 | A01F 15/04 |
| EP | 4111848 A1 | * | 1/2023 | A01F 15/042 |
| FR | 2863821 A1 | * | 6/2005 | A01F 15/0825 |
| GB | 2373427 A | * | 9/2002 | A01F 12/442 |
| RU | 2011138295 A | * | 3/2013 | A01F 15/101 |
| RU | 2567014 C2 | * | 10/2015 | A01F 15/046 |
| WO | WO-9423558 A2 | * | 10/1994 | A01F 15/00 |
| WO | WO-9617508 A1 | * | 6/1996 | A01F 15/10 |
| WO | WO-0001215 A1 | * | 1/2000 | A01F 15/101 |
| WO | WO-2010106038 A1 | * | 9/2010 | A01F 15/0825 |
| WO | WO-2011053122 A1 | * | 5/2011 | A01F 15/101 |
| WO | WO-2013072473 A1 | * | 5/2013 | A01F 15/04 |
| WO | WO-2013083519 A1 | * | 6/2013 | A01F 15/10 |
| WO | WO-2014135564 A1 | * | 9/2014 | A01F 15/042 |
| WO | WO-2017068058 A1 | * | 4/2017 | A01F 15/101 |
| WO | WO-2017068060 A1 | * | 4/2017 | A01F 15/101 |
| WO | WO-2017116982 A1 | * | 7/2017 | A01F 15/042 |
| WO | WO-2018109544 A1 | * | 6/2018 | A01D 90/02 |
| WO | WO-2019123039 A1 | * | 6/2019 | A01F 15/042 |
| WO | WO-2023083519 A1 | * | 5/2023 | B23D 61/006 |

* cited by examiner

CONVEYING AND COLLECTING DEVICE WITH A DRIVABLE CONVEYING AND COLLECTING UNIT AND AGRICULTURAL CROP PRESS WITH THE CONVEYING AND COLLECTING DEVICE

BACKGROUND OF THE INVENTION

The present invention concerns a conveying and collecting device for an agricultural crop press, with a drivable conveying and collecting unit that can be switched from a collecting mode, in which it is provided for collecting crop in a collecting chamber, into a lifting mode, in which it is provided for conveying crop out of the collecting chamber, wherein the conveying and collecting unit comprises a feed bar whose feed tines are rotatable as a function of the mode of the conveying and collecting unit, with a first cam track, which is provided for rotating the feed tines of the feed bar and which can be switched from a fixed state, in which it is stationarily arranged in the conveying and collecting device and the conveying and collecting unit is in the collecting mode, into a moving state, in which it is driven by the conveying and collecting unit and the conveying and collecting unit is in the lifting mode, with a coupling device, which is provided for operatively connecting the first cam track to the conveying and collecting unit in a coupling process so that the first cam track is driven, and with a sensor unit, which is provided for detecting a filling level of the collecting chamber. The present invention concerns moreover an agricultural crop press with such a conveying and collecting device.

The publication DE 198 29 276 A1 discloses a collecting press for agricultural crop. The collecting press comprises a pre-press unit with a conveying channel and a conveyor, wherein the conveyor comprises several rakes each with a plurality of tines arranged along a rotatable shaft that rotate about a central rotor shaft and thereby convey the crop through the conveying channel. The pre-press unit is provided for pre-pressing the crop. For this purpose, an opening of the conveying channel is closed until the crop contained in the conveying channel has been sufficiently compressed. Upon sufficient compression, it is conveyed by means of a rake of the conveyor that is embodied as a feed rake through the opening into a press channel. This is possible only in a window of time in which a piston provided for pressing the crop in the press channel releases the opening.

In order to determine the compression, the collecting press comprises a pressure sensor device with a plurality of holding plates which are fastened so as to be pivotably about a holding shaft and project into the conveying channel. With a sufficient filling level or sufficient compression of the crop, the holding plates pivot out of the conveying channel. In this way, the opening is released and the feed rake conveys the crop into the press channel.

The angle of rotation that is assumed by the tines of the rake, respectively, is adjusted by means of cam tracks. As the tines of the feed rake convey the crop through the opening into the press channel, they must not rotate out of the conveying channel. For this purpose, a cam track that predefines the tine position is moved during this. The movement of the cam track is triggered by the pressure sensor device as a function of the filling level of the feed channel. The pressure sensor device is mechanically connected by a shift linkage to an anvil latch that releases a pawl of a swivel coupling when the holding plates rotate out of the feed channel. By means of the swivel coupling, the movable cam track is then coupled to the rotor shaft so that it rotates therewith.

Due to the shift linkage, the anvil latch is therefore connected by forced control with the holding plates of the pressure sensor device.

However, due to the inertia of such a mechanical coupling, faulty switching may occur in marginal cases, for example, when the filling level in the conveying channel during a window of time in which the press piston releases the opening to the press channel has been almost reached but the holding plates have not yet pivoted out of the conveying channel and the pawl for coupling the movable cam track to the rotor shaft therefore has not yet been released. The conveying channel can then clog in the following window of time.

The mechanism can also drift out of sync after a continuously switched conveying stroke where crop is conveyed into the press channel for each piston stroke when the filling level decreases only minimally but the pawl is still released due to the inertia of the coupling even though the anvil latch for the collecting operation has already pivoted back.

In limit ranges as, for example, when starting or shutting down the press, sufficient power must be additionally made available for switching the tine position of the feed rake from collecting the crop in the conveying channel to conveying the crop out of the conveying channel so that a uniform bale fill and shape is ensured.

Object of the invention is to provide a bale press in which switching from the collecting mode into the lifting mode and back is carried out reliably and without fault even in limit ranges, which ensures a uniform bale fill and shape, and which is cost-efficient with regard to the cost of the bale press as well as the operating cost of the bale press.

SUMMARY OF THE INVENTION

The object is solved with a conveying and collecting device for an agricultural crop press,
 with a drivable conveying and collecting unit that can be switched from a collecting mode, in which it is provided for collecting crop in a collecting chamber, into a lifting mode, in which it is provided for conveying the crop out of the collecting chamber, wherein the conveying and collecting unit comprises a feed bar whose feed tines are rotatable as a function of the mode of the conveying and collecting unit,
 with a first cam track, which is provided for rotating the feed tines of the feed bar and which can be switched from a fixed state, in which it is stationarily arranged in the conveying and collecting device and the conveying and collecting unit is in the collecting mode, into a moving state, in which it is driven by the conveying and collecting unit and the conveying and collecting unit is in the lifting mode,
 with a coupling device, which is provided for operatively connecting the first cam track to the conveying and collecting unit in a coupling process so that the first cam track is driven, and
 with a sensor unit which is provided for detecting a filling level of the collecting chamber,
characterized in that
the conveying and collecting device comprises a switching means that is provided to trigger or to prevent the coupling process of the coupling device as a function of the filling level of the collecting chamber, wherein triggering or preventing of the coupling process is realized mechanically independently of the detection of the filling level of the collecting chamber.

The object is further solved with an agricultural crop press, in particular square bale press, with a conveying and collecting device as disclosed.

Advantageous embodiments can be taken from the dependent claims.

For this purpose, a conveying and collecting device for an agricultural crop press is created. The conveying and collecting device comprises a drivable conveying and collecting unit that can be switched from a collecting mode, in which it is provided for collecting crop in a collecting chamber, into a lifting mode, in which it is provided for conveying the crop out of the collecting chamber.

For collecting the crop, the conveying and collecting unit comprises a feed bar. Along the feed bar, feed tines are distributed in uniform arrangement. The feed tines extend in the same direction. Moreover, the feed bar is rotatably provided about a feed axis which extends in the direction of the feed bar. In this way, an angle of rotation of the feed tines can be changed. The feed tines are rotatable as a function of the mode of the conveying and collecting unit.

The conveying and collecting unit comprises in addition a first cam track. The first cam track is provided for rotation of the feed tines of the feed bar. For this purpose, the feed bar is guided along the cam track. The angle of rotation of the feed tines is adjusted in this context as a function of the course of the cam track. The cam track can be switched from a fixed state, in which it is stationarily arranged in the conveying and collecting device and the conveying and collecting unit is in the collecting mode, into a moving state, in which it is driven by the conveying and collecting unit and the conveying and collecting unit is in the lifting mode. Due to the movement of the cam track in the lifting mode, the angle of rotation of the feed tines changes differently in the lifting mode than in the collecting mode. In this way, the feed tines can convey crop out of the collecting channel in the lifting mode.

The conveying and collecting device comprises in addition a coupling device which is provided for operatively connecting the first cam track to the conveying and collecting unit in a coupling process. When the first cam track is operatively connected to the conveying and collecting unit, it is driven. The conveying and collecting unit is then in the lifting mode.

In order to detect the filling level of the collecting chamber, the conveying and collecting device comprises in addition a sensor unit.

The conveying and collecting device is distinguished in that it comprises a switching means that is provided to trigger or to prevent the coupling process of the coupling device as a function of the filling level of the collecting chamber. Triggering or preventing of the coupling process is realized in this context mechanically independently of the detection of the filling level of the collecting chamber.

Since the coupling process is triggered or prevented independently of the detection of the filling level of the collecting chamber, it is not even possible for faulty switching to occur due to the inertia of a mechanical coupling. The conveying and collecting device according to the invention operates therefore reliably and without fault even in limit ranges.

Preferably, the conveying and collecting device comprises a switching lever interacting with the switching means. The switching lever is preferably adjustable reversibly from a base position into an actuating position. In this context, the switching means is preferably reversibly switchable from an active state, in which it releases the switching lever, into an inactive state, in which it is holds the switching lever by friction and/or form fit in the base position. In this context, the switching means holds the switching lever preferably against the force of a pretensioning element in the base position. In this context, it is furthermore preferred that the switching lever in the actuating position is operatively connected to the coupling device. By switching the switching means in the active state, the switching lever can therefore be adjusted with the force of the pretensioning element from the base position into the actuating position.

Particularly preferred, a spring is used as a pretensioning element. Alternatively, a hydraulic cylinder can be used also. In respect to the hydraulic cylinder, the use of a spring has the advantage that the force of the spring is available even in limit situations such as, for example, upon starting and shutting down the press, without utilization of further possibly complex energy stores. Also, them this arrangement ensures therefore triggering or preventing of the coupling process so that a uniform bale fill and shape is ensured.

The coupling device comprises preferably a force means that is provided for activation of the coupling device. When the coupling device is activated, the coupling process can be performed with forced control. The force means is preferably designed as a spring. Furthermore, the coupling device comprises a coupling switch which is adjustable against the force of the force means. In this context, it is in particular preferred that the coupling device can be deactivated by actuation of the coupling switch. Also, a reverse arrangement is preferred in which the coupling device is deactivated by the force of the force means and is activated by actuation of the coupling switch.

In this embodiment, by switching the switching means into the active state, the switching lever is adjusted from the base position into the actuating position so that the switching lever actuates the coupling switch and the coupling device is deactivated. The switching means in this embodiment is therefore provided to prevent the coupling process. In case of a faulty function of the switching means and/or of the switching lever, the coupling device is activated, in particular by the force of the force means. The conveying and collecting unit is then moved into the lifting mode by forced control. Such a faulty function therefore cannot lead to clogging of the collecting channel.

Since the switching means must be switched, and therefore supplied with current, only for deactivation of the coupling device from the inactive into the active state, it can be operated very cost-efficiently. When holding the load, it is in the inactive state, provides its holding moment, and is not supplied with current.

The conveying and collecting unit is designed preferably as a rotor and is provided to be rotatable about a central rotor axis. In this context, the feed bar is arranged at a distance from the rotor axis. For collecting the crop, it is preferred that the conveying and collecting unit comprises in addition to the feed bar at least one or a plurality of collecting bars. Since the collecting bars are provided only for collecting the crop, their collecting tines are preferably controlled by means of a second cam track which is always stationarily arranged at the conveying and collecting device.

In this context, the conveying and collecting device is preferably designed to eject the crop within a cyclic repeating window of time out of the collecting chamber. Since triggering or preventing of the coupling process and detection of the filling level of the collecting chamber are done independent of each other, a point in time for switching can be very precisely observed within the window of time that is available.

In this embodiment, it is preferred that a cycle is determined by a complete revolution of the conveying and collecting unit. The conveying and collecting device is then preferably designed to detect and/or check the filling level of the collecting chamber for each complete revolution of the conveying and collecting unit at least once. Switching is realized in this context preferably at a point in time as late as possible that still enables ejection within the actual window of time. In this way, a crop quantity which is flowing very late into the collecting chamber within the actual cycle can still be taken into consideration in regard to the determination whether the crop is to be conveyed out of the collecting chamber or not.

For control of the switching means, the conveying and collecting device comprises preferably a control unit. The control unit is moreover preferably also provided for detecting and/or checking the filling level of the collecting chamber. The control unit enables consideration of switching times of components. In this way, the point in time at which it controls the switching means in order to trigger activation or deactivation of the coupling device can be determined very precisely.

In order to drive the first cam track in the lifting mode, the coupling device is preferably designed to couple a drive disk to the conveying and collecting unit so that it rotates together with the conveying and collecting unit.

Preferably, the drive disk is designed for driving a rocker that drives the first cam track in the lifting mode by means of a coupling drive. The coupling drive enables during a revolution of the conveying and collecting unit a reciprocating movement of the first cam disk.

The sensor unit comprises preferably a sensing rocker with holding plates which project into the collecting chamber as well as an angle of rotation sensor, wherein the angle of rotation sensor determines an angle of rotation of the sensing rocker. In order to ensure that the holding plates do not impair the crop flow in the lifting mode, it is preferred that the drive disk comprises a drive contour which is provided for pivoting the holding plates out of the collecting chamber in the lifting mode.

Further preferred, the coupling device comprises a coupling disk that comprises an outer contour, that rotates together with the conveying and collecting unit, and is provided for returning the switching lever from the actuating position into the base position. The switching lever is preferably restored in a cyclic fashion. In this way, the coupling device is activated in a cyclic fashion. Provided the switching means is embodied as an electromagnetically operated spring force brake, the return of the switching lever at least at times can be realized against the holding force of the switching means. In this context, the switching means is deactivated so that it applies its holding force. The return of the switching lever is realized then additionally against the force of its pretensioning element. In this way, brake means such as, for example, brake disks can be cleaned. However, the switching means can also be or remain activated when restoring the switching lever. In this case, the return is realized only against the force of the pretensioning element of the switching lever. Only thereafter, the switching means is deactivated. Since the switching means in this context does not exert its holding force, brake means can then not be cleaned however.

The object is further solved with an agricultural crop press, in particular with a square bale press, with such a conveying and collecting device. The crop press can also be designed as a round bale press, in particular a continuously operating round bale press, that comprises an ante-chamber for pre-pressing a bale.

In a preferred embodiment, the agricultural crop press comprises an operating unit wherein the nominal value for the filling level of the collecting chamber can be adjusted at the operating unit by an operator of the crop press. Provided the agricultural crop press is a towed crop press, such an operating unit can be arranged also in a tractor to which the agricultural crop press is connected wherein the nominal value is then adjustable at the operating unit of the tractor.

BRIEF DESCRIPTION OF THE DRAWINGS

In the following, the invention will be described with the aid of Figures. The Figures are only exemplary and do not limit the general inventive concept.

DESCRIPTION OF THE PREFERRED EMBODIMENTS

Figure 1:
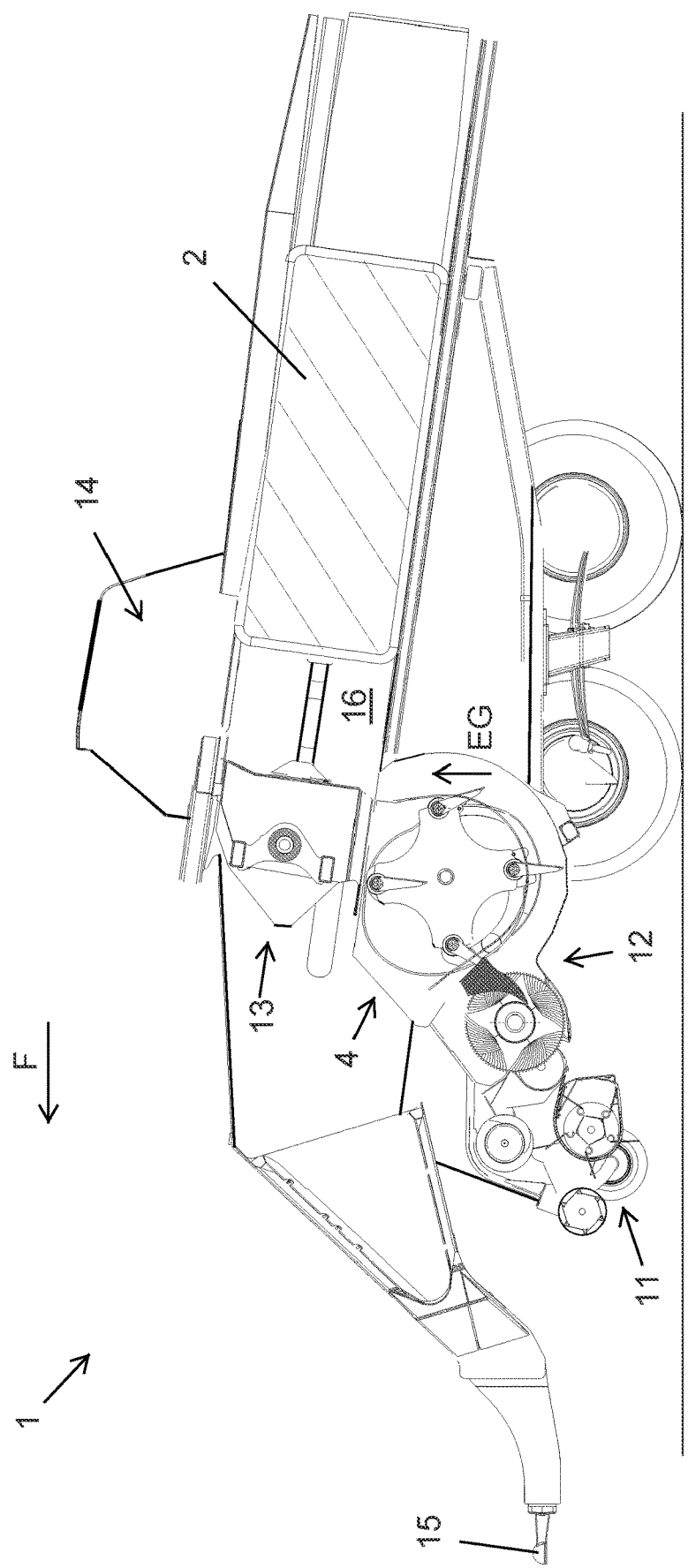
FIG. 1 shows schematically an agricultural crop press according to the prior art.

FIG. 1 shows schematically an agricultural crop press 1 according to the prior art. The agricultural crop press 1 is a square bale press. The invention is however not limited to a square bale press but also applicable to other crop presses such as, for example, continuously operating round bale presses in which crop is collected in a pre-press unit during tying of a bale until the tied bale has left the press chamber and the latter is released for the crop that has been pre-pressed in the pre-press unit.

In the following, the terms agricultural crop press 1 and square bale press are employed synonymously.

The crop press 1 of FIG. 1 is provided to be pulled by a tractor (not illustrated). It comprises for this purpose a trailer coupling 15 at the front in the travel direction F. The invention is however also applicable to self-propelled crop presses.

The crop press 1 of FIG. 1 comprises as a receiving device 11 a pick-up for picking up crop from the ground. The crop is supplied to a cutting device 12 that is arranged downstream of the receiving device 11 in a crop flow direction EG. After cutting, it is supplied to a conveying and collecting device 4 that is provided for collecting the crop. The conveying and collecting device 4 comprises a collecting chamber 45 (see FIGS. 2a, 2b) as well as a conveying and collecting unit 41 (see FIGS. 2a, 2b). The conveying and collecting unit 41 is provided for collecting the crop in the collecting chamber 45. It is designed here as a rotor and comprises a plurality of rakes 43, 44 (see FIGS. 2a, 2b) that convey the crop in a combing manner to an outlet opening 454 (see FIGS. 2a, 2b) of the collecting chamber 45.

A press unit 13 is provided downstream of the outlet opening 454 in the crop flow direction EG. Upon sufficient compression of the crop, it is conveyed by means of a rake 43, 44 of the conveying and collecting unit 41 embodied as a feed rake 44 (see FIGS. 2a, 2b) through the outlet opening 454 into a press chamber 16 of the press unit 13. The press unit 13 comprises a press piston (not identified) which is reciprocatingly moved in the press chamber 16 in a cyclic manner in order to press the crop collected in the press chamber 16 to a square bale 2.

The transfer of the crop from the conveying and collecting device 4 into the press chamber 16 is therefore possible only in a window of time in which the press piston that is reciprocatingly guided in the press chamber 16 for pressing the crop releases the outlet opening 454.

Above the press chamber, a tying unit 14 is arranged in which tying material (not illustrated) for tying the square bale 2 is stored. After pressing a complete bale 2, the latter is tied by means of the tying material by the tying unit 14 so that it does not fall apart again.

Figure 2A:
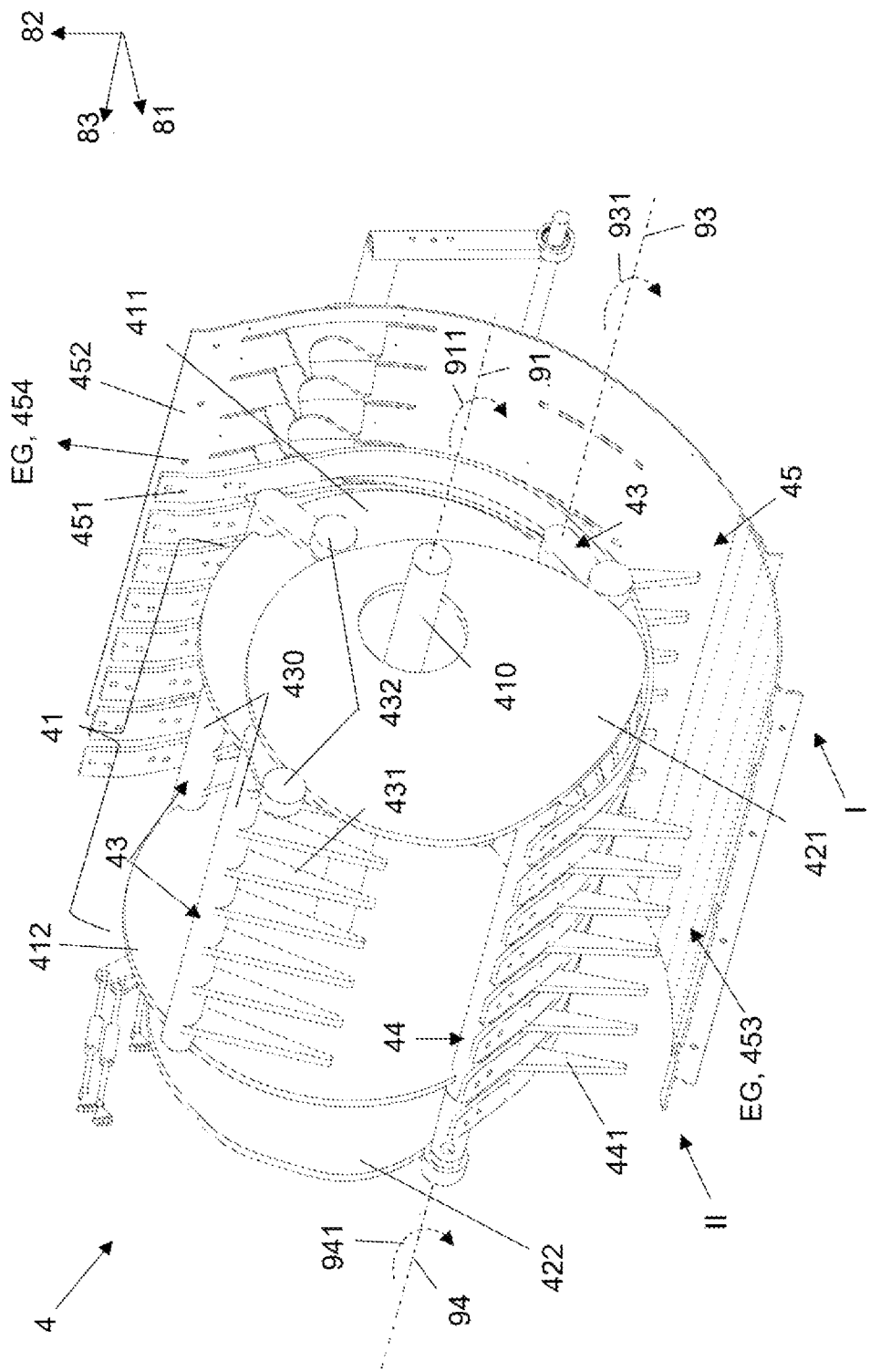
FIGS. 2a and 2b show schematically a conveying and collecting device for an agricultural crop press according to the invention in different perspective views.
Figure 2B:
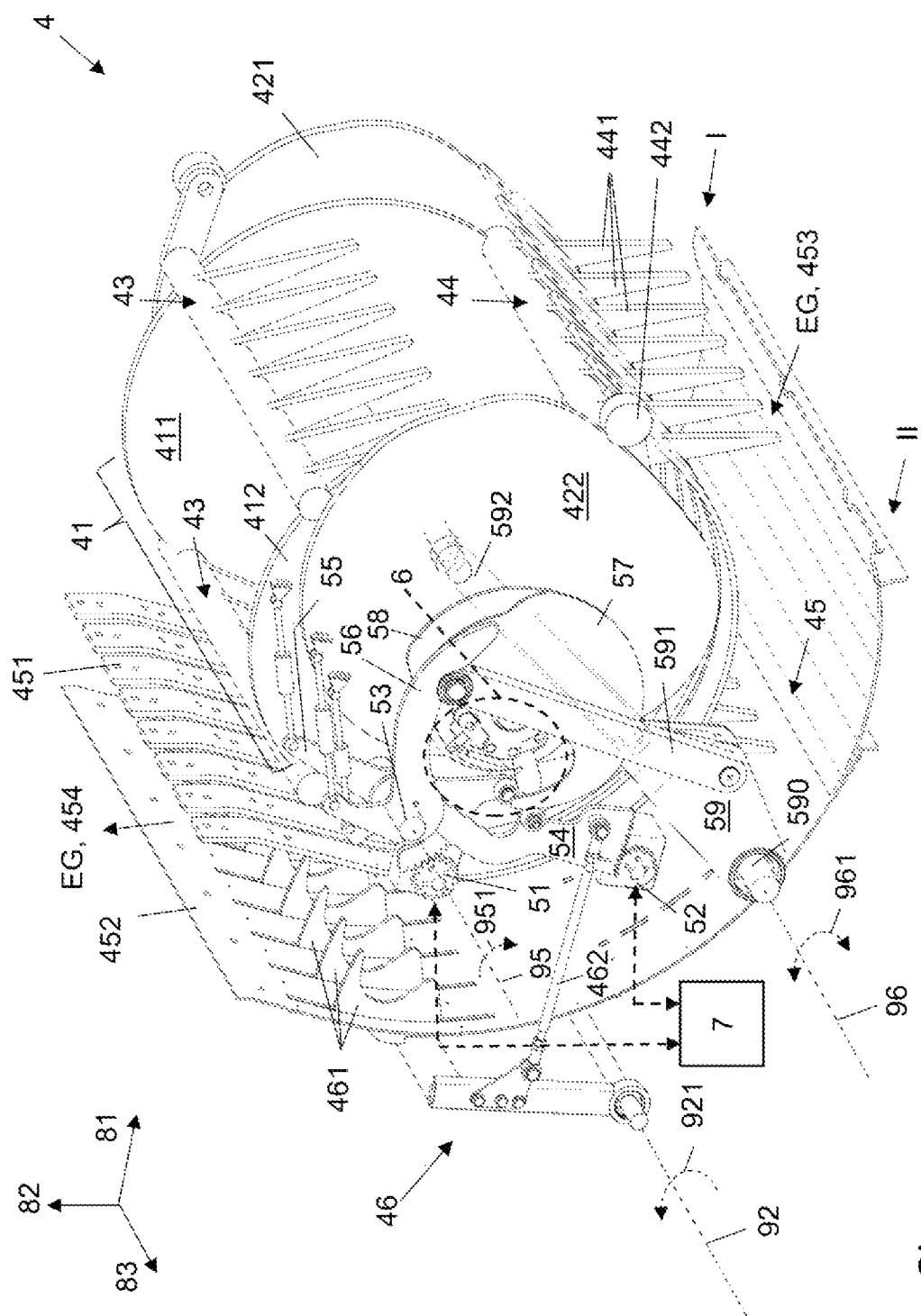

FIGS. 2a and 2b show schematically a conveying and collecting device 4 for an agricultural crop press 1 according to the invention in different perspective views. The conveying and collecting device 4 in the present embodiment is provided as a component of a square bale press.

It comprises a conveying and collecting unit 41 which is embodied here as a rotor. In the following, the terms conveying and collecting unit 41 and rotor are synonymously used. The rotor 41 comprises a continuous rotor shaft 410. It extends between oppositely positioned sides I, II of the conveying and collecting device 4, here in a transverse direction 83 transversely to a longitudinal direction 81 of the conveying and collecting device 4. On the rotor shaft 410, two drum disks 411, 412 are fixedly supported that are spaced apart from each other.

For collecting crop, the rotor 41 is driven so that it rotates (arrow 911) about the rotor shaft 410.

The drum disks 411, 412 are provided as bearings for a feed bar 44. The feed bar 44 is spaced apart from the rotor shaft 410. Along the feed bar 44, feed tines 441 are arranged at uniform spacings. The feed bar 44 is supported on the drum disks 411, 412 so as to be rotatable about a feed axis 94. The feed tines 441, which extend in radial direction relative to the feed axis 94, are therefore rotatable about the latter.

In addition, the drum disks 411, 412 serve here as bearings for a plurality of collecting bars 43. The collecting bars 43 are spaced apart from the rotor shaft 410 in radial direction. Collecting tines 431 are arranged along the collecting bars 43 at uniform spacings. The collecting bars 43 are supported on the drum disks 411, 412 so as to be rotatable (arrow 931) about a collecting axis 93 so that the collecting tines 431 each are rotatable about the respective collecting axis 93 along which their collecting bar 43 is extending. The collecting tines 431 extend also in radial direction in relation to their collecting axis 43.

The conveying and collecting device 4 comprises in addition a collecting chamber 45 which is embodied here as a collecting channel and comprises an inlet opening 453 and an outlet opening 454. In the following, the terms collecting chamber 45 and collecting channel are used synonymously. The collecting channel 45 is limited by a channel bottom 452. In addition, the rotor 41 is surrounded by strippers 451 which are spaced apart from each other in transverse direction 83 so that between the strippers 451 gaps (not identified) are provided. The tines 431, 441 of the collecting bars 43 and of the feed bar 44 pass through the gaps during a revolution of the rotor 41 at least in sections so that they project into the collecting channel 45.

In operation of the conveying and collecting unit 41, the tines 431, 441 are provided to comb through the collecting channel 45. In doing so, they convey crop contained in the collecting channel 45 from the inlet opening 453 in the crop flow direction EG to the outlet opening 454.

The crop can be pre-pressed in the collecting channel 45. For this purpose, a nominal value for the filling level of the collecting channel 45 is adjusted. For measuring the filling level of the collecting channel 45, the conveying and collecting device 4 comprises a sensor unit 52, 46, that comprises a sensing rocker 46 as well as an angle of rotation sensor 52 wherein the angle of rotation sensor 52 is operatively connected to the sensing rocker 46 and measures the angle of rotation about which the sensing rocker 46 is adjusted.

For measuring the filling level of the collecting channel 45, the sensing rocker 46 is rotatably supported (arrow 921) about a sensing axis 92 and comprises holding plates 461 which pass through slots (not identified) in the channel bottom 452 and project into the collecting channel 45. The crop which is collected in the collecting channel 45 displaces the holding plates 461 so that the sensing rocker 46 is pivoted about the sensing axis 92. The sensing rocker 46 is connected by a connecting arm 462 to a sensing lever 54 (see FIG. 3a) that is pivoted (arrow 951) in this context about a bearing axis 95 (see FIG. 2b). At a sensor end 541 (see FIG. 3a) of the sensing lever 54, a toothing (not identified) is arranged that serves for transmission and is in engagement with a spur gear (not identified) of the angle of rotation sensor 52. The spur gear upon pivoting of the sensing lever 54 is rotated so that the angle of rotation sensor 52 measures the filling level in the collecting channel 45. The sensing lever is pivoted against the force of a pretensioning means 543 that serves as a damper. In this way, a vibration of the sensing lever 54 can quickly subside when the latter is rotated, for example, by crop which pivots the sensing rocker 46. In addition, the pretensioning means 543 also enables a uniform return pivoting action of the sensing rocker 46 until the holding plates 461 engage in the collecting chamber 45.

In order to increase the filling level of the collecting chamber 45, a basic moment of the sensing rocker 46 is increased. In this way, more crop can be collected in the collecting channel 41 and can be more strongly pre-pressed before the crop is conveyed from the collecting channel 41 into the press chamber 16.

In order to adjust an angle of rotation of the tines 431, 441 in such a way that they pass through the collecting channel 45 in defined regions, two cam tracks 421 are provided. The cam tracks 421, 422 are arranged at ends of the conveying and collecting unit 41 that are arranged oppositely in transverse direction 83. In this context, the first cam track 422 is provided for adjusting the angle of rotation of the feed tines 441 and a second cam track 421 for the adjustment of the angle of rotation of the collecting tines 431.

The second cam track 421 is arranged stationarily in the conveying and collecting device 4. The collecting bars 43 each comprise a collecting roller 432 which is guided along the second cam track 421 upon driving of the conveying and collecting unit 41. In this context, the collecting bars 43 rotate in accordance with the course of the second cam track 421 about its collecting axis 93 so that the angle of rotation of their collecting tines 431 is determined in accordance with the course of the second cam track 421.

In an analog manner, the feed bar 44 is guided by means of a feed roller 442 along the first cam track 422 wherein the feed bar 44 rotates (arrow 941) in accordance with the course of the first cam track 422 about its feed axis 94. In this way, the angle of rotation of the feed tines 441 is adjusted. However, the first cam track 422, as a function of a mode S, H of the conveying and collecting unit 41, is either arranged stationarily in the conveying and collecting device 4 or is driven by the rotor shaft 410.

The conveying and collecting unit 41 is switchable from a collecting mode S, in which it is provided for collecting the crop in the collecting channel 45, into a lifting mode H, in which it is provided for ejecting the crop out of the collecting channel 45.

The collecting tines 431 of the collecting bar 43 are provided for collecting crop in the collecting mode S as well as in the lifting mode H.

In contrast thereto, the feed tines 441 of the feed bar 44 are provided for collecting in the collecting mode S. However, in the lifting mode H they are provided for ejecting the crop through the outlet opening 454 out of the conveying and collecting device 4. In the present embodiment, it is conveyed from the conveying and collecting device 4 into the press channel 16 of the square bale press 1. For this purpose, the feed tines 441 when approaching the outlet opening 454 must not rotate out of the collecting channel 45. In order to realize this, the first cam track 422 is moved in the lifting mode H.

For this purpose, the first cam track 422 is switchable from a fixed state FZ, in which it is stationarily arranged in the conveying and collecting device 4 and the conveying and collecting unit 41 is in the collecting mode S, into a moving state BZ, in which it is driven by the conveying and collecting unit 41 and the conveying and collecting unit 41 is in the lifting mode H.

In order to drive the first cam track 422, the conveying and collecting device 4 comprises a coupling device 6 which is provided for operatively connecting the first cam track 422 with the conveying and collecting unit 41, in particular with the rotor shaft 410.

The coupling device 6 will be described with the aid of FIG. 3a.

The coupling device 6 comprises a force means 63 that is provided for activating the coupling device 6. When the coupling device 6 is activated, a coupling process can be performed with forced control by means of which the first cam track 422 is operatively connected to the rotor shaft 410. The force means 63 is embodied here as a spring. In addition, the coupling device 6 comprises a coupling switch 64. The coupling switch 64 is adjustable against the force of the force means 63. By actuating the coupling switch 64, the coupling device 6 is deactivated.

The coupling device 6 comprises a coupling disk 58 which is arranged fixedly on the rotor shaft 410 and rotates together with it when the conveying and collecting unit 41 is driven. The coupling disk 58 comprises a switch window 580 into which a first and a second pawl 61, 62 project which are arranged at a drive disk 57. The drive disk 57 is rotatably supported on the rotor shaft 410. By engagement of the pawls 61, 62 in a switching region 581 of the switch window 580, the drive disk 57 can be coupled to the rotor shaft 410 so that it rotates together therewith.

The drive disk 57 is connected by a first coupling rod 591 with a rocker 59 which is rotatably supported about a rocker stay 590. The rocker 59 is connected by a second coupling rod 592 to the first cam track 422.

When the coupling device 6 is disengaged, the first coupling rod 591 for driving the rocker 59 is held in a defined position by a zero adjuster 56 by the force of the return means 563. When the coupling device 6 is engaged and the drive shaft 57 is driven, the force of the pretensioning return means 563 is overcome and the first coupling rod 591 is rotated against the force of the return means 563 out of the zero adjuster 56.

In this context, the rocker 59 is rotated back and forth about the rocker stay 590 (axis 96; arrow 961). In this way, the cam disk 422 is rotated back and forth. The conveying and collecting unit 41 is then in the lifting mode H. In this way, the feed tines 441 when approaching the outlet opening 454 move significantly later, considered locally, out of the collecting channel 45. In this way, they can convey the crop from the collecting channel 45 through the outlet opening 454 into the press chamber 16.

The pawls 61, 62 of the coupling device 6 are pretensioned relative to each other by the force means 63. In this way, with a revolution of the conveying and collecting unit 41, the first pawl 61 automatically moves into the switching region 581 of the switch window 580 when it is not pushed back by the coupling switch 64 which is arranged at the first pawl 61. The coupling device is therefore always active unless it is deactivated by the actuation of the coupling switch 64 so that the coupling process is prevented.

The coupling switch 64 can be actuated by a switching lever 55. The latter is also illustrated in FIG. 3a.

The switching lever 55 is adjustable by a force of a pretensioning element 553 from a base position G, in which it does not interact with the coupling switch 64, into an actuating position B, in which it actuates the coupling switch 64, and back again against the force of the pretensioning element 553. For actuating the coupling switch 64, the switching lever 55 comprises an actuating roller 552 as an actuating means which serves as a stop for the coupling switch 64 in the actuating state B.

For adjusting the switching lever 55, a switching means 51 is provided. The switching means 51 is switchable mechanically independently of the sensor arrangement 46, 52. For switching the switching means 51, a control unit 7 is provided which switches the switching means 51 as a function of the filling level in the collecting channel 45. In this context, the filling level in the collecting channel 45 is detected in a cyclic manner, i.e., in particular for each revolution of the conveying and collecting unit 41. The decision whether the switching means 51 is to be switched is realized based on a nominal value for the filling level in the collecting chamber 45. The nominal value can be adjustable by the operator at an operating console.

The switching means 51 is embodied as an electromagnetically switchable spring force brake. It is switchable reversibly from an active state a, in which it releases the switching lever 55, into an inactive state i, in which it holds the switching lever 55 by friction and/or form fit in the base position G. In the inactive state i, not electrically controlled, the switching means 51 therefore exerts its holding force. In the active state a of the switching means 51 in which it is supplied with current, the switching lever 55 can be adjusted, on the other hand, by the force of the pretensioning element 553 from the base position G into the actuating position B. In the actuating position B, the switching lever 55 actuates the coupling switch 64. The coupling device 6 is deactivated in this way. In the present embodiment, the coupling process is prevented in this way.

Between the switching means 51 and the switching lever 55, a transmission stage can be provided. At a switching end 554 (see FIG. 3a) of the switching lever 55, a toothing (not identified) can be arranged for this purpose that serves for transmission and is in engagement with a spur gear (not identified) of the switching means 51. In this context, the transmission can be selected such that the acting holding moment of the switching means 51 is designed smaller than the moment which is applied by the pretensioning element 553 on the switching lever 55 and is required for actuating the coupling device 6. In an alternative embodiment, the switching means 51 can act also directly on the switching lever 55 and for this purpose can be arranged, for example, on the bearing axis 53 of the switching lever 55.

The press piston of the square bell press 1 and the conveying and collecting device 4 are matched to each other such that the conveying and collecting unit 41 performs one complete rotation with each piston stroke. In a window of time during the return stroke of the press piston, the crop can be conveyed into the press chamber 16. The conveying and collecting device 4 is designed such that the decision whether the crop is to be conveyed or not into the press chamber 16 in the subsequent window of time is made as late as possible.

Figure 3A:
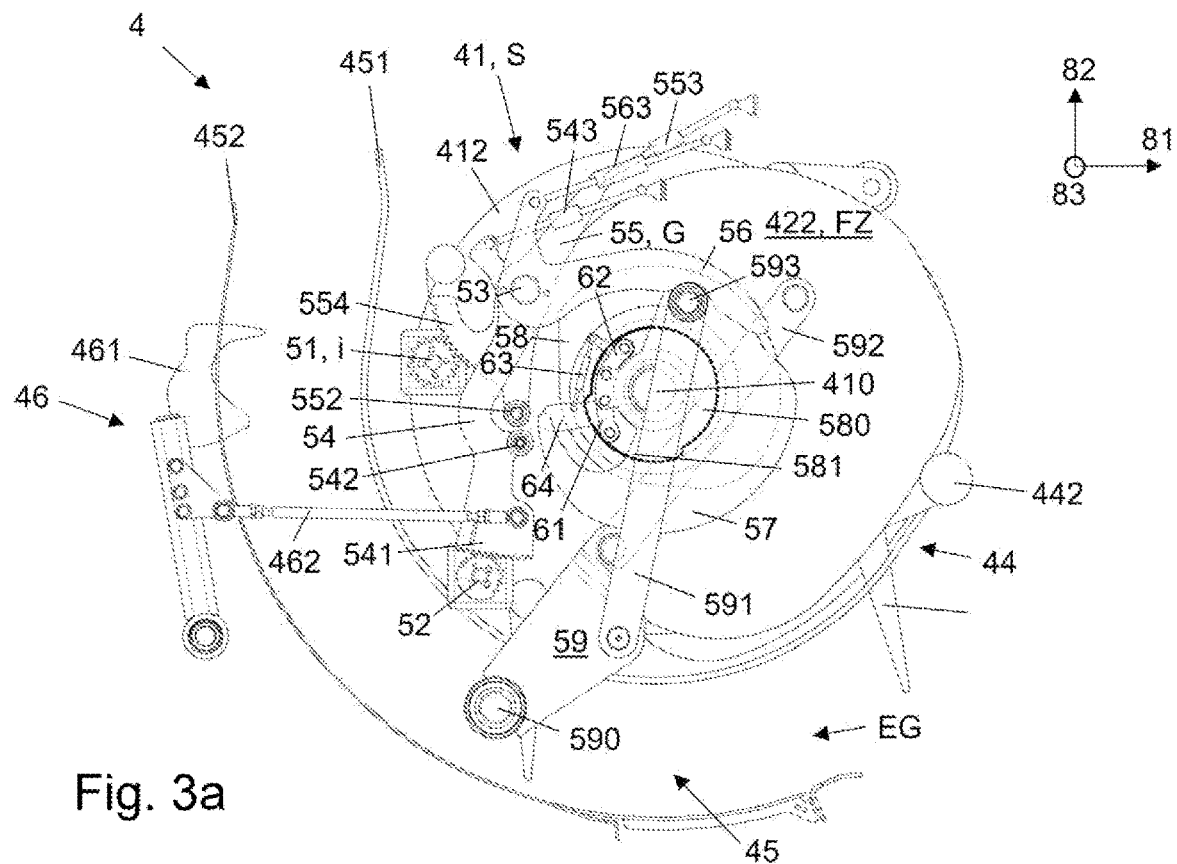
FIGS. 3a, 3b, 3c, 3d, 3e, 3f each show a side view of the conveying and collecting device of FIGS. 2a and 2b.

FIG. 3a shows the conveying and collecting device 4 in an initial position. In the initial position, the first cam disk 422 is in the fixed state FZ so that the conveying and collecting unit 41 is in the collecting mode S. The switching means 51 is in the inactive state i so that it holds the switching lever 55 in the base position.

The angle of rotation sensor 52 of the sensor unit 52, 46 detects by means of the sensing rocker 46 the filling level in the collecting chamber 45.

For the decision whether the crop is to be conveyed or not until the subsequent one out of the collecting chamber in the actual window of time, the switching means 51 holds the switching lever 55 as long as possible in the base position G. In this way, the coupling switch 64 is not actuated so that the first pawl 61 moves into the switching region 581 of the switch window 580.

Figure 3B:
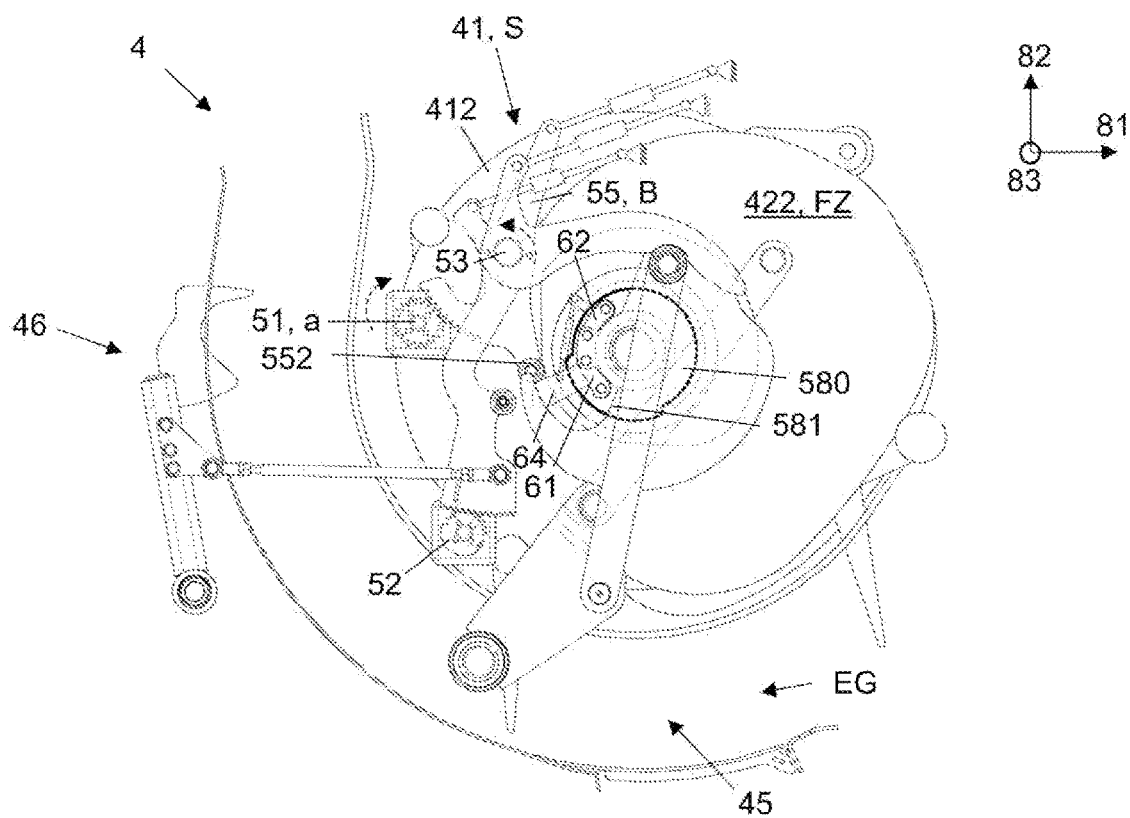

The control unit 7 is configured to prevent the coupling process as long as the nominal value has not been reached. This is shown in FIG. 3b.

For this purpose, the switching means 51 is activated by the control unit 7. The switching means 51 is supplied with current so that the holding moment of the switching means 51, in particular by electromagnetic force, is canceled. A separation time that occurs in this context in which the switching lever 55 is no longer held by the holding moment of the switching means 51 can be taken into consideration by the control unit 7. Since the holding moment of the switching means 51 is canceled, the switching lever 55 is pivoted from the base position G into the actuating position B. The actuation roller 552 actuates the coupling lever 64 against the force of the force means 63 so that the coupling device 6 is deactivated. The first pawl 61 is lifted in this way out of the switching region 581 of the switch window 580. The switch window 580 with its switching region 581 is illustrated in bold print in FIGS. 3a and 3b.

The coupling device 6 therefore does not couple the drive disk 57 to the rotor shaft so that the drive disk 57 does not rotate. Therefore, the first cam disk is not driven and the conveying and collecting unit remains in the collecting mode S.

Figure 3C:
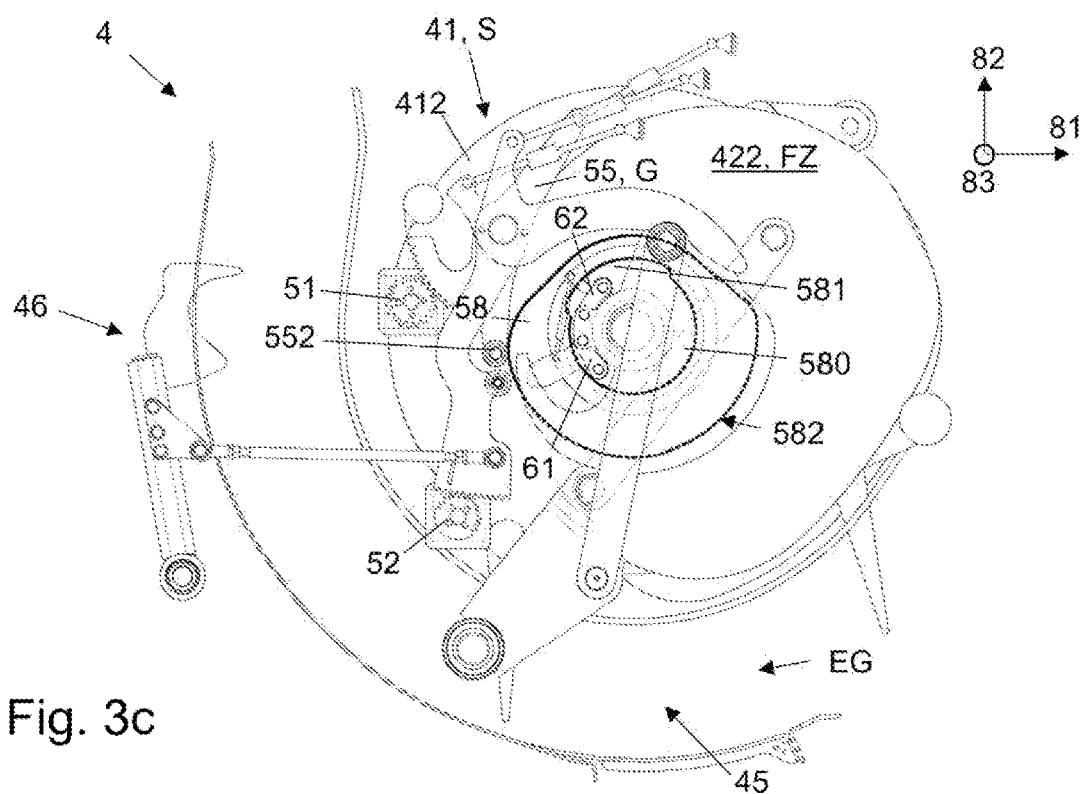

The coupling disk 58 comprises an outer contour (not identified) which is provided for return of the switching lever 55 from the actuating position B into the base position G. Upon further rotation of the coupling disk 58, the actuating roller 552 contacts the outer contour of the coupling disk 58. In this way, the switching lever 55 is returned into the base position G. This can be done for the activated as well as deactivated switching means 51. The return of the switching lever 55 is shown in FIG. 3c. The outer contour of the coupling disk is illustrated in bold print in FIG. 3c. By returning the switching lever 55, the coupling switch 64 is no longer actuated and the coupling device 6 is activated.

Figure 3D:
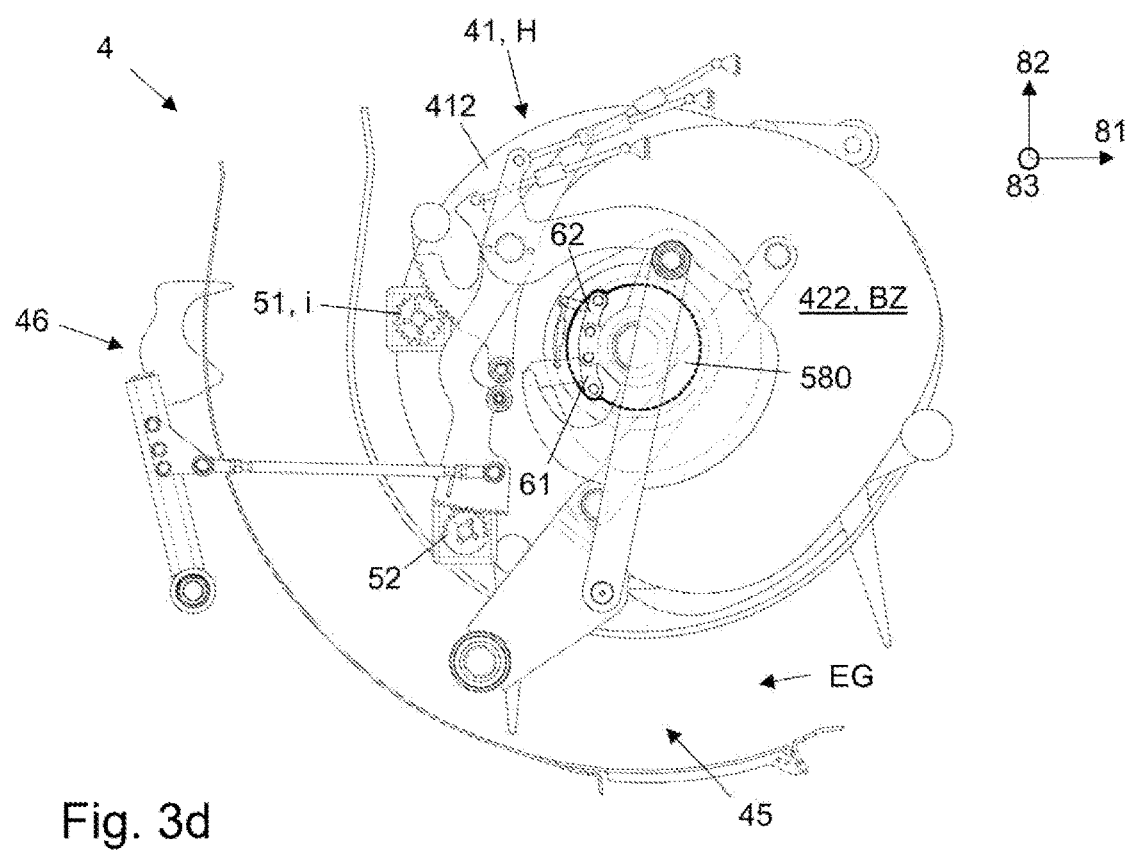

FIG. 3d shows the conveying and collecting device 4 during the following revolution of the conveying and collecting unit 41. The coupling device 6 is in the active state. The nominal value for the filling level is reached and the coupling process was not prevented. In this way, both pawls 61, 62 have moved into the switching region 581 of the switch window 580. The drive disk 57 is therefore coupled to the rotor shaft 410. It is rotated together with the conveying and collecting unit 41 about the rotor axis 91 (see arrow 911).

Figure 3E:
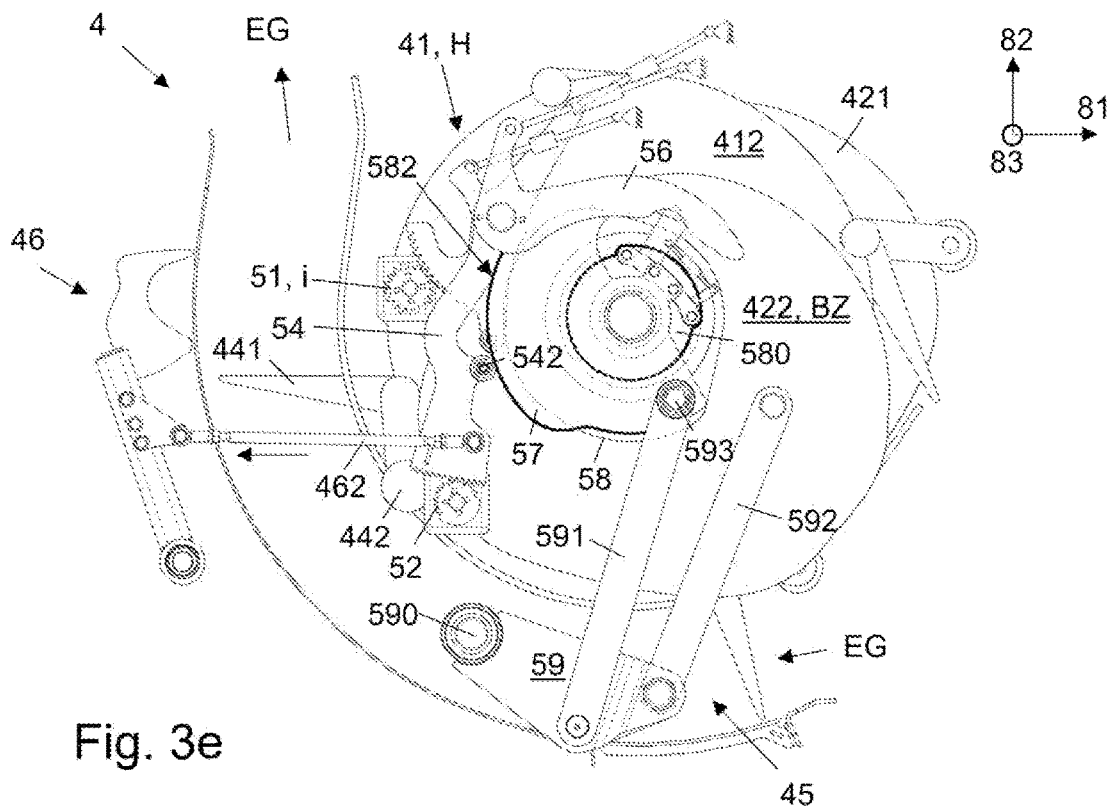

The drive disk 57 pushes the first coupling drive 591 out of the zero adjuster 56. In this way, the rocker 59 is pivoted about the rocker stay 590. The rocker 59 drives by means of the second coupling drive 592 the first cam track 42. The latter is thus pivoted in reciprocating manner. In this way, the feed tines 441 are rotated such that they do not initially rotate out of the collecting channel when approaching the outlet opening. In this way, they can convey the crop in the collecting channel through the outlet opening into the press channel. The conveying and collecting unit 41 is in the lifting mode H. This is illustrated in FIG. 3e.

Figure 3F:
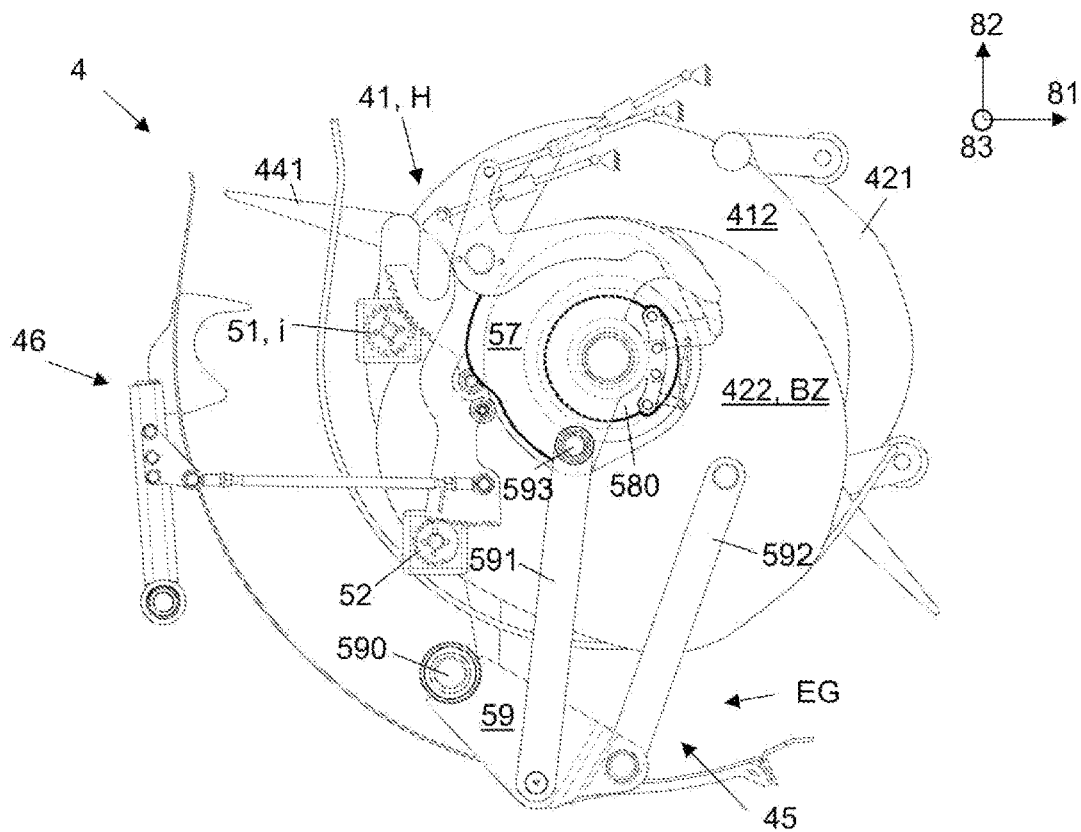

So that the holding plates 461 of the sensing rocker 46 of the sensor unit 46, 52 do not impair conveyance of the crop, the sensing rocker 46 is pivoted so that the holding plates 461 no longer project into in the collecting channel 45. For this purpose, a drive contour (not identified) of the drive disk 58 is utilized. The drive contour is illustrated in FIGS. 3e and 3f by a bold line. At the sensing lever 54, a contact means 542 is provided for this which comes into contact at the drive contour and pivots the sensing lever 54. By means of the connecting arm 462, the sensing rocker 46 is pivoted in this context. This is schematically indicated by an arrow.

After the drive contour provided for pivoting the sensing rocker 46 has passed the contact means 542, the sensing lever 54 and together therewith the sensing rocker 46 are pivoted back by the force of the pretensioning means 543. In this way, the sensing unit 46, 52 again detects the filling level in the collecting chamber 45 by means of the sensing rocker 46. This is shown in FIG. 3f. The conveying and collecting unit 41 is still in the lifting mode H.

Upon subsequent rotation, it is again decided whether the nominal value for the filling level has been reached. Should this be the case, the switching means 51 remains in the inactive state i. The first cam track 422 is further pivoted and the feed tines 441 convey the crop from the collecting channel 45 into the press channel 16.

Should the filling level not be reached, the switching means 51 is switched into the active state a and thus supplied with current. In this way, the switching lever 55 is adjusted again from the base position G into the actuating position B. The actuating means 552 actuates the coupling switch 64 so that the coupling device 6 is deactivated and initially the first pawl 61 and subsequently the second pawl 62 are moved out of the switching region 581 of the switch window 580. The drive disk 57 is then no longer driven and the first coupling rod 591 is caught at end 593 by the zero adjuster 56. The conveying and collecting unit 41 is then again in the collecting mode S. This process is repeated in a cyclic manner with each revolution of the conveying and collecting unit 41.

Since the detection of the filling level and switching of the switching means 51 are separated from each other mechanically, no faulty switching of the conveying and collecting device 4 which is caused by the mechanical coupling can occur anymore. The utilization of an electromagnetically actuated spring force brake or coupling as switching means 51 has the advantage that the conveying and collecting device 4, in case of failure of the onboard power supply, moves into the lifting mode H and conveys crop out of the conveying channel 45. In this way, upon such a failure, no clogging of the collecting channel 45 can occur. In addition, permanent movements are avoided in this way that cause wear of the components.

What is claimed is:

1. A conveying and collecting device for an agricultural crop press, the conveying and collecting device comprising:
    a collecting chamber;
    a drivable conveying and collecting unit arranged in the collecting chamber and configured to be switched from a collecting mode into a lifting mode, wherein, in the collecting mode, the drivable conveying and collecting unit is configured to collect a crop in the collecting chamber, wherein, in the lifting mode, the drivable conveying and collecting unit is configured to convey the crop out of the collecting chamber, wherein the drivable conveying and collecting unit comprises a feed bar comprising feed tines;
    a first cam track configured to rotate the feed tines of the feed bar as a function of the collecting mode and of the lifting mode, wherein the first cam track is configured to be moved from a fixed state, in which the first cam track is stationarily arranged in the conveying and collecting device and the drivable conveying and collecting unit is in the collecting mode, into a moving state, in which the first cam track is driven by the drivable conveying and collecting unit and the drivable conveying and collecting unit is in the lifting mode;
    a coupling device configured to operatively connect the first cam track to the drivable conveying and collecting unit in a coupling process so that the first cam track is driven by the drivable conveying and collecting unit, wherein the coupling device comprises a force means, wherein the force means is configured to activate the coupling device so that the coupling process is performed with a forced control;
    a sensor unit configured to detect a filling level of the collecting chamber;
    a switching means configured to trigger or to prevent the coupling process of the coupling device as a function of the filling level of the collecting chamber, wherein the switching means triggers or prevents the coupling process mechanically independently of a detection of the filling level of the collecting chamber by the sensor unit;
    wherein the switching means is supplied with current to be switched from an inactive state into an active state only for deactivation of the coupling process of the coupling device.

2. The conveying and collecting device according to claim 1, further comprising a switching lever interacting with the switching means, wherein the switching means is configured to be switched reversibly from the active state into the inactive state, wherein the switching means releases the switching lever in the active state, and wherein the switching means secures the switching lever with friction and/or form fit in a position in the inactive state.

3. The conveying and collecting device according to claim 1, wherein the switching means is an electromagnetically actuated spring force brake or coupling.

4. The conveying and collecting device according to claim 1, wherein the coupling device further comprises a coupling switch and the coupling switch, when actuated, deactivates the coupling device.

5. The conveying and collecting device according to claim 1, further comprising a control unit configured to control the switching means and/or the filling level of the collecting chamber.

6. The conveying and collecting device according to claim 1, wherein the conveying and collecting device is configured to detect the filling level of the collecting chamber in a cyclic manner.

7. The conveying and collecting device according to claim 6, wherein the conveying and collecting device is configured to detect the filling level of the collecting chamber for each full revolution of the conveying and collecting unit.

8. The conveying and collecting device according to claim 1, wherein the conveying and collecting unit is a rotor configured to rotate about a central rotor axis, wherein the feed bar is arranged at a distance from the central rotor axis.

9. The conveying and collecting device according to claim 8, wherein the coupling device is configured to couple a drive disk to the rotor so that the drive disk rotates together with the rotor.

10. The conveying and collecting device according to claim 9, wherein the drive disk is drivingly connected to a rocker of the coupling device, wherein the rocker is connected to a coupling drive of the coupling device and the coupling drive is connected to the first cam track, wherein, in the lifting mode, the first cam track is driven by the rocker via the coupling drive.

11. An agricultural crop press comprising a conveying and collecting device according to claim 1.

12. The agricultural crop press according to claim 11, wherein the agricultural crop press is a square bale press.

13. The agricultural crop press according to claim 11, wherein a nominal value for the filling level of the collecting chamber is adjustable by an operator of the agricultural crop press.

14. A conveying and collecting device for an agricultural crop press, the conveying and collecting device comprising:
    a collecting chamber;
    a drivable conveying and collecting unit arranged in the collecting chamber and configured to be switched from a collecting mode into a lifting mode, wherein, in the collecting mode, the drivable conveying and collecting unit is configured to collect a crop in the collecting chamber, wherein, in the lifting mode, the drivable conveying and collecting unit is configured to convey the crop out of the collecting chamber, wherein the drivable conveying and collecting unit comprises a feed bar comprising feed tines;
    a first cam track configured to rotate the feed tines of the feed bar as a function of the collecting mode and of the lifting mode, wherein the first cam track is configured to be moved from a fixed state, in which the first cam track is stationarily arranged in the conveying and collecting device and the drivable conveying and collecting unit is in the collecting mode, into a moving state, in which the first cam track is driven by the drivable conveying and collecting unit and the drivable conveying and collecting unit is in the lifting mode;
    a coupling device configured to operatively connect the first cam track to the drivable conveying and collecting unit in a coupling process so that the first cam track is driven by the drivable conveying and collecting unit;
    a sensor unit configured to detect a filling level of the collecting chamber;
    a switching means configured to trigger or to prevent the coupling process of the coupling device as a function of the filling level of the collecting chamber, wherein the switching means triggers or prevents the coupling process mechanically independently of a detection of the filling level of the collecting chamber by the sensor unit;

a switching lever interacting with the switching means, wherein the switching means is configured to be switched reversibly from an active state into an inactive state, wherein the switching means releases the switching lever in the active state, and wherein the switching means secures the switching lever with friction and/or form fit in a position in the inactive state;

wherein, in the active state of the switching means, the switching lever is adjustable from a base position into an actuating position, wherein the switching lever is not operatively connected to the coupling device in the base position, and wherein the switching lever is operatively connected to the coupling device in the actuating position and triggers or prevents the coupling process.

15. A conveying and collecting device for an agricultural crop press, the conveying and collecting device comprising:

a collecting chamber;

a drivable conveying and collecting unit arranged in the collecting chamber and configured to be switched from a collecting mode into a lifting mode, wherein, in the collecting mode, the drivable conveying and collecting unit is configured to collect a crop in the collecting chamber, wherein, in the lifting mode, the drivable conveying and collecting unit is configured to convey the crop out of the collecting chamber, wherein the drivable conveying and collecting unit comprises a feed bar comprising feed tines;

a first cam track configured to rotate the feed tines of the feed bar as a function of the collecting mode and of the lifting mode, wherein the first cam track is configured to be moved from a fixed state, in which the first cam track is stationarily arranged in the conveying and collecting device and the drivable conveying and collecting unit is in the collecting mode, into a moving state, in which the first cam track is driven by the drivable conveying and collecting unit and the drivable conveying and collecting unit is in the lifting mode;

a coupling device configured to operatively connect the first cam track to the drivable conveying and collecting unit in a coupling process so that the first cam track is driven by the drivable conveying and collecting unit;

a sensor unit configured to detect a filling level of the collecting chamber;

a switching means configured to trigger or to prevent the coupling process of the coupling device as a function of the filling level of the collecting chamber, wherein the switching means triggers or prevents the coupling process mechanically independently of a detection of the filling level of the collecting chamber by the sensor unit;

a switching lever interacting with the switching means, wherein the switching means is configured to be switched reversibly from an active state into an inactive state, wherein the switching means releases the switching lever in the active state, and wherein the switching means secures the switching lever with friction and/or form fit in a position in the inactive state;

wherein the coupling device comprises a coupling disk comprising an outer contour, wherein the outer contour is configured to return the switching lever from the actuating position into the base position.

16. A conveying and collecting device for an agricultural crop press, the conveying and collecting device comprising:

a collecting chamber;

a drivable conveying and collecting unit arranged in the collecting chamber and configured to be switched from a collecting mode into a lifting mode, wherein, in the collecting mode, the drivable conveying and collecting unit is configured to collect a crop in the collecting chamber, wherein, in the lifting mode, the drivable conveying and collecting unit is configured to convey the crop out of the collecting chamber, wherein the drivable conveying and collecting unit comprises a feed bar comprising feed tines;

a first cam track configured to rotate the feed tines of the feed bar as a function of the collecting mode and of the lifting mode, wherein the first cam track is configured to be moved from a fixed state, in which the first cam track is stationarily arranged in the conveying and collecting device and the drivable conveying and collecting unit is in the collecting mode, into a moving state, in which the first cam track is driven by the drivable conveying and collecting unit and the drivable conveying and collecting unit is in the lifting mode;

a coupling device configured to operatively connect the first cam track to the drivable conveying and collecting unit in a coupling process so that the first cam track is driven by the drivable conveying and collecting unit;

a sensor unit configured to detect a filling level of the collecting chamber;

a switching means configured to trigger or to prevent the coupling process of the coupling device as a function of the filling level of the collecting chamber, wherein the switching means triggers or prevents the coupling process mechanically independently of a detection of the filling level of the collecting chamber by the sensor unit;

a switching lever interacting with the switching means, wherein the switching means is configured to be switched reversibly from an active state into an inactive state, wherein the switching means releases the switching lever in the active state, and wherein the switching means secures the switching lever with friction and/or form fit in a position in the inactive state;

wherein the switching means is a brake and a return of the switching lever from the actuating position into the base position is realized at least partially against a holding force of the brake.

* * * * *